Aug. 24, 1965  D. D. PHINNEY  3,202,107
PISTON ROD ASSEMBLY FOR FLUID TRANSLATING DEVICES
Filed June 28, 1963  2 Sheets-Sheet 1
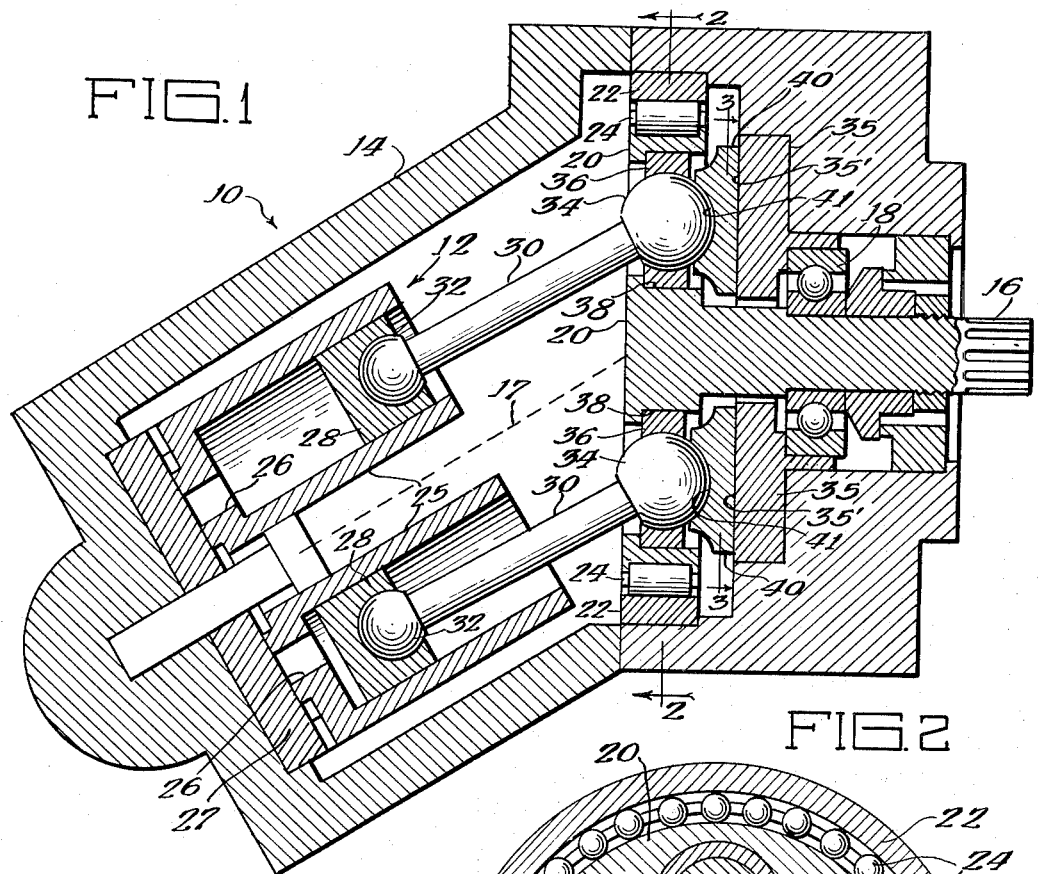
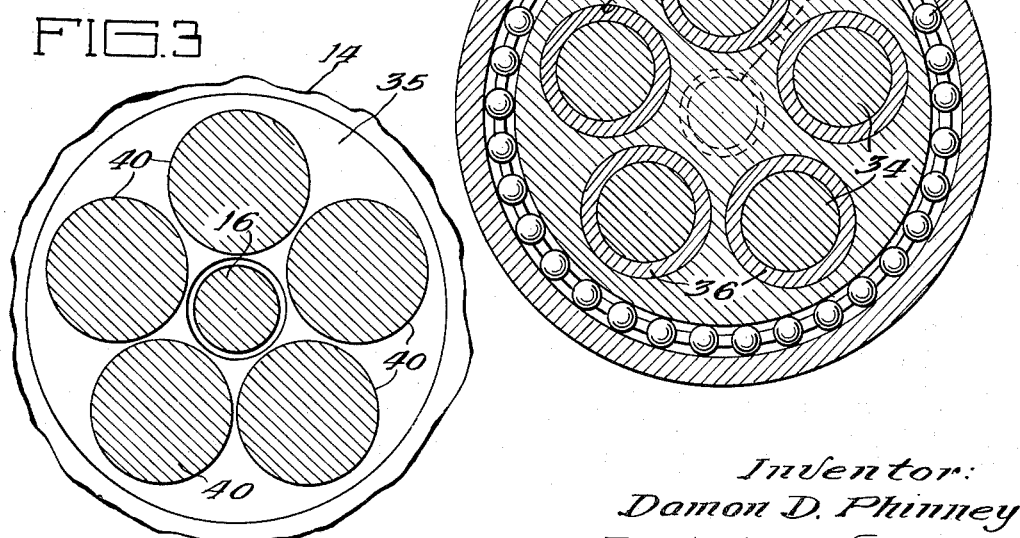
Inventor:
Damon D. Phinney
By: Hofgren, Wegner, Allen,
Stellman & McCord
Attorneys

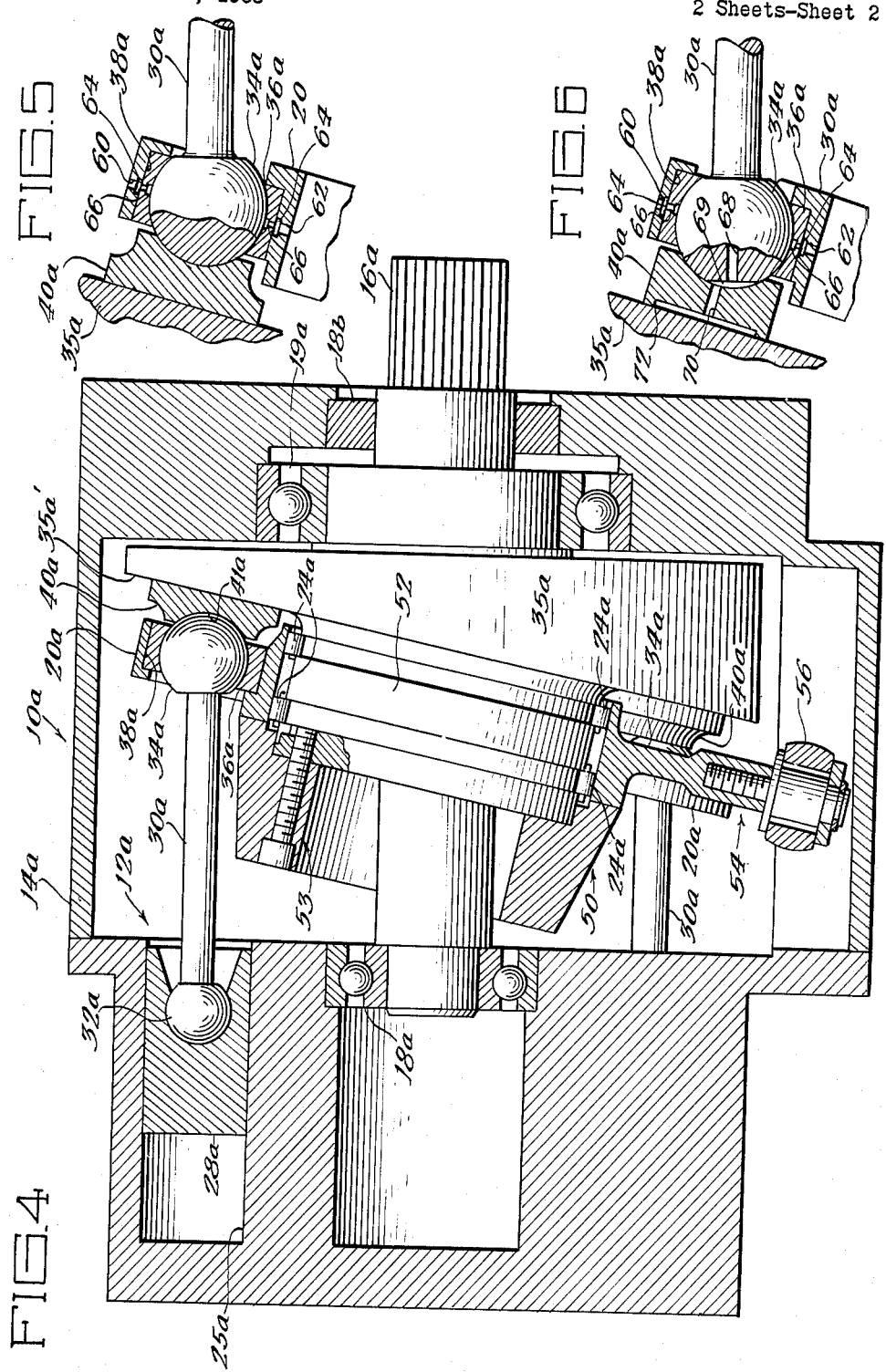

United States Patent Office 3,202,107
Patented Aug. 24, 1965

3,202,107
PISTON ROD ASSEMBLY FOR FLUID
TRANSLATING DEVICES
Damon D. Phinney, Boulder, Colo., assignor to Sundstrand Corporation, a corporation of Illinois
Filed June 28, 1963, Ser. No. 291,373
10 Claims. (Cl. 103—162)

This invention relates to hydraulic pumps or the like and more particularly to a piston rod assembly therefor.

In hydraulic axial piston pumps with articulated piston rods acting between the pistons and the inclined cam surface for actuating the pistons, the angular forces at the piston rod end adjacent the cam surface create certain problems in connection with bearing design, balancing, and mass of mounting elements. In the past, remedial action has generally included the provision of massive assemblies to distribute concentrated loads from the connecting rods sufficiently to eliminate such loads as might cause early bearing failure. But in pumps utilizing stationary cylinder blocks with a rotating wobbler assembly the increased mass of the assembly brings about problems in balancing the same. On pumps having a stationary thrust plate and a rotating cylinder block the bulky bearing arrangement needed to support the heavy eccentric load received from the inclined piston rod reduces the advantage of the higher efficiency achieved from smaller size and weight in the pumping section.

It is therefore a primary object of this invention to provide a new and improved pump.

It is another object of this invention to provide a new and improved pump having a novel cam and reaction plate assembly therein.

It is still another object of this invention to provide a new and improved pump having means therein for subjecting the piston rod mounting to forces only normal thereto.

It is yet another object of this invention to provide a new and improved pump of the connecting rod type having a stationary cylinder block therein and an inclined rotating wobbler for reciprocating pistons in cylinders in the cylinder block wherein the piston rod ends are secured to the wobbler assembly by means which divide the angular forces received from the piston rod into the normal components thereof.

It is yet a further object of this invention to provide a new and improved pump of the connecting rod type having a rotating cylinder block inclined relative to a rotating rotor and a stationary cam plate wherein the piston rod ends are associated with the rotor and cam plate by means which divide the angular forces from the rods into the normal and parallel components thereof.

It is still a further object of this invention to provide a new and improved means for securing a rod having a ball end in a socket carried by a plate wherein the relative axes of the rod and plate are inclined to each other.

It is a further object of this invention to provide a new and improved means for securing a rod having a ball end to a socket assembly wherein the axes of the rod and socket assembly are inclined relative to each other having means for dividing angular forces received by the socket from the piston rod into the normal and parallel components thereof including a collar crimped about the periphery of the ball end and slidingly positioned in a socket in a rotor and a slipper in facial juxtaposition with the ball end and in sliding engagement with a stationary or rotating thrust plate.

Other objects and advantages will be readily apparent from the following detailed description taken in connection with the accompanying drawings, in which:

FIGURE 1 is a partially diagrammatic section view of a rotating cylinder block pump embodying this invention;

FIGURE 2 is a section view taken along the line 2—2 of FIGURE 1;

FIGURE 3 is a section view taken along 3—3 of FIGURE 1;

FIGURE 4 is a partially diagrammatic section view of a stationary cylinder block pump embodying this invention;

FIGURE 5 is an enlarged fragmentary somewhat diagrammatic view in partial section showing a modification of the slipper and collar construction of this invention for hydrodynamic lubrication between the slipper and the cam; and FIGURE 6 is an enlarged fragmentary view in partial section of the slipper and collar construction of this invention showing a further modification for hydrostatic lubrication between the slipper and the cam.

While this invention is susceptible of embodiment in many different forms, there are shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

In FIGURE 1 there is shown a pump 10 having a rotatable cylinder block 12. The block is surrounded by a housing 14 and includes a drive shaft 16 which may be rotatably driven by an appropriate source (not shown). The drive shaft 16 is journaled in bearings 18 for rotating an integral rotor or reaction plate 20. The rotor 20 is journaled for rotation inside a fixed circumferential sleeve 22 by means of roller bearings 24 which are spaced about the periphery of the rotor. A suitable shaft represented diagrammatically by broken line 17 is rotatable with block 12 and has a suitable driving universal connection with shaft 16 so that block 12 rotates with shaft 16 about an axis which is inclined relative to the axis of the shaft 16.

The rotatable cylinder block 12 is provided with a plurality of cylinders 25 having ports as at 26 communicating with the cylinders for receiving and pumping fluid therethrough. On rotation of the cylinder block, ports 26 communicate successively with arcuate inlet and outlet ports (not shown) in a port plate 27 and in the end of housing 14 in a well known manner. Each cylinder has a piston 28 therein which is pivotally secured to one end of a piston rod 30 for relative reciprocation in each cylinder to pump fluid thereby. Preferably the end of the rod on which the piston is secured is ball-shaped as at 32 and similarly the opposite end of the piston rod which is adjacent the rotor also has a ball-shaped end 34.

The ball end 34 of the piston rod is operably associated with the rotor 20 and a stationary cam or thrust plate 35. The thrust plate 35 surrounds the drive shaft 16 and is spaced from and parallel to, as well as being situated at the rear of, the rotor. The rotor and the thrust plate 35 combine to provide a thrust or rotor assembly for the piston rod ends 34 so that the rotation of the inclined cylinder block and the rotor causes reciprocation of the pistons in the cylinders and effects a pumping action thereby.

Since the cylinder block is inclined relative to the axis of the drive shaft, the rotor and the thrust plate, the longitudinal axis of the piston rods will also be inclined relative to the aforementioned components. The rotor and thrust plate, or the combination of the rotor and cam assembly, is provided with a means for securing the rod ball end 34 which divides the angular forces received from the inclined piston rod into the normal and parallel components thereof, that is, into components radial and axial of drive shaft 16. This means of securing the rod ball end subjects the thrust plate only to forces normal thereto and subjects the rotor only to forces radial thereto. This is accomplished by providing a collar 36 which is crimped about the intermediate periphery of the rod ball end and is slidingly mounted in a socket 38 in the rotor 20 for movement in the direction of the longitudinal extent of the drive shaft. Thus that angular component of forces received from the piston rod which is parallel to the drive shaft will cause the collar to slip in its socket and thereby effectively prevent any such angular forces from being received by the rotor. That component of the angular force which is radial to the drive shaft will be imparted to the rotor and be absorbed by the radial bearing 24.

The cam plate 35 is provided with a slipper which is slidingly mounted on the cam face 35' thereof. This slipper 40 has a dished surface 41 which mates with the end of the periphery of the ball end 34 and is in facial juxtaposition therewith. The slipper is free to slide on surface 35' in any direction perpendicular to the axis of the drive shaft in response to forces imparted thereto due to the inclination of the piston rod relative thereto. That component of forces which is perpendicular to the drive shaft will not be imparted to the cam plate due to the slippage of the slipper in response thereto. However, that component of the forces received from the piston rod which is perpendicular to the cam plate will be received and absorbed thereby. Thus, since the collar will slip in response to forces parallel to the drive shaft and the slipper will slip in response to forces perpendicular thereto, the rotor will receive only forces which are radial thereto and the cam plate will receive forces only which are perpendicular thereto as the angular forces received from the piston rod are divided into the normal and parallel components thereof.

In FIGURE 4 the collar construction of this invention is shown in use with an axial piston pump 10a having a stationary cylinder block 12a formed associated with a housing portion 14a. The pump 10a has a drive shaft 16a rotatably journaled in bearing 18a and a thrust bearing 19a and may be driven by an appropriate source (not shown). The drive shaft 16a rotates a cam assembly 50 which includes a rotatable thrust plate in the form of a wobbler or cam 35a associated with shaft 16a and having an inclined thrust surface or cam face 35a'. A bearing plate or reaction plate 20a is spaced in front of and parallel to the inclined face of the wobbler 35a and is mounted on a bearing boss 52 thereof by suitable clamp means 53. Boss 52 has an axis inclined to the primary axis of shaft 16a. Radial bearings 24a are selectively positioned about the periphery of the boss 52 between the boss and the inner periphery of the reaction plate 20a so that the wobbler may rotate relative to the reaction plate. A rotation restraining means 54 extends from the reaction plate into a slot 56 in the housing 14a, forcing the reaction plate to undergo a nutating motion in response to the rotation of the wobbler. Pumping action is accomplished by rotation of the wobbler 35a which causes reciprocation of the pistons 28a relative to the cylinders 25a.

Pistons 28a are reciprocally mounted in cylinders 25a in the stationary cylinder block 12a. The pistons 28a are secured to piston rods 30a which each have two ball ends 32a and 34a. The ball end 34a is secured to the cam and reaction plate in a manner similar to that described for the rotatable cylinder block pump. That is, a collar 36a is crimped about the intermediate circumference of each rod ball end and slidingly mounted in a socket 38a in the reaction plate 28a for limited movement in a direction normal to wobbler surface 35a'. Also a slipper 40a is slidingly mounted on the inclined face of the wobbler and has a dished face 41a for mating with the periphery of the rod ball end 34a in facial juxtaposition therewith. Thus each slipper 40a is slidable on the face of the wobbler.

Suitable valve means (not shown) may be associated in a conventional manner with the cylinders 25a to admit fluid thereto on the suction strokes of the pistons 28a and to exhaust fluid therefrom under pressure on the pumping strokes of the pistons.

In the embodiment of FIGURES 1–3 and in the embodiment of FIGURE 4, the pistons 28 may be moved through the suction strokes so that slippers 40 follow the low part of the cam face either by hydraulic intake pressure supplied to the cylinders 25 or by the inwardly turned flanges on reaction plate 20 engaging collars 36, since in each embodiment the reaction member 20 or 20a is restrained against axial movement.

In FIGURE 5 there is shown a modification of the slipper and collar construction of this invention adapted for hydrodynamic lubrication between the slipper and the cam, as also contemplated in FIGURES 1 and 4. This type of construction is particularly suited for use with a corrosive or nonlubricating type fluid which should not be brought to the slipper face where it could leak into the cam components and cause damage thereto. In FIGURE 5, the reaction plate socket is provided with opposed ports 60 and 62 which connect into a groove in the socket 64 for permitting lubricating fluid in the wobbler cavity to be brought to the surface of the rod ball through ports 66 in the collar 36a.

In FIGURE 6 a further modification adapting the rod ball end for hydrostatic lubrication between the slipper and the cam is shown. This type of construction is applicable for use where the fluid pumped by the cylinders is a suitable lubricant and therefore can be ducted into the slipper face through ports in the piston (not shown) and a passage 68 in a connecting rod. Here again the reaction plate socket is provided with opposed ports 60 and 62 leading into a groove 64 in alignment with the collar ports 66. Furthermore, the duct 68 which leads from the cylinders opens into a wide opening 69 in the rod ball end. The opening 69 is in communication with a port 70 in the slipper which extends generally perpendicular to the cam face. The port 70 opens into a recess 72 in the base of the slipper adjacent the face of the cam. In this construction the pumped fluid can be supplied to the cam and reaction plate assembly for aiding the lubrication thereof.

The feature of the separated collar and slipper of this invention is that the slipper is completely free to swivel on the connecting rod ball end. This permits the slipper to adopt a slight angle relative to the face of the wobbler in the hydrodynamically lubricated construction shown in FIGURE 5 which is preferable in order to build up a fluid wedge. In the construction shown in FIGURE 6 illustrating the hydrostatic lubrication, this relative freedom of the slipper to pivot permits the slipper to adjust for minor irregularities in the cam plate or wobbler face or to compensate for any lack of parallelism between these faces and the rotor or reaction plate. In the hitherto known conventional construction wherein the collar and slipper were a single piece, the force component being in the plane of the reaction plate or rotor, would tend to force the slipper against the wall of the socket. In such a position, the slipper was restricted in its ability to swivel and build up a hydrodynamic fluid wedge or to compensate for any irregularities.

The invention disclosed herein provides a means for improving the structural integrity of stationary and rotating cylinder block axial piston pumps as well as improving the balancing and weight ratio problems thereof. By means of the disclosed construction the forces imparted by the rod ball end are divided into the components thereof so that the reaction plate (FIGURE 4) or rotor (FIGURE 1) is subjected primarily only to forces which are radial thereto and the cam or thrust plate is subjected primarily only to forces which are normal to the cam or thrust surface thereof. This construction permits the use of a reaction plate or rotor of reduced mass and simplifies the balancing problems of the rotating wobbler. The socket construction itself is relatively simple so as to minimize the production cost thereof. Thus the disclosure of this invention provides an improved means for reducing the cost and increasing the efficiency of rotating cylinder block pumps or rotating cam pumps of the type described.

While the pump constructions shown and described include pump cylinders and pistons parallel to the axis of the cylinder block, it should be understood that the invention is not necessarily limited to such constructions but will also find utility in constructions in which the cylinders may be generally axially disposed but somewhat inclined to the cylinder block axis, and the term "axial piston pump" is intended to refer to all such constructions. It should also be understood that while the pump constructions disclosed are both fixed displacement devices, the principles of the invention are also applicable to variable displacement devices. For a variable displacement stationary cylinder block pump, the low mass of the reaction plate made possible by this invention will be found to be a particular advantage for balancing purposes.

I claim:

1. In a pump having a housing, a drive shaft and rotor driven thereby, a cam plate, a rotatable cylinder block inclined relative to the axis of said rotor and driven by said drive shaft, a plurality of cylinders in said cylinder block, a plurality of pistons reciprocably mounted in said cylinders, each having a rod with the rod end in operable engagement with said rotor and actuatable by said cam plate, in combination therewith the improvement which comprises means for subjecting said cam plate to forces normal thereto and means for subjecting said rotor to forces radial thereto, said means for subjecting said cam plate to forces normal thereto comprising a slipper slidably mounted thereon and in mating facial juxtaposition with said rod ball end, and wherein said means for subjecting said rotor to forces radial thereto comprises a collar separate from the slipper circumferentially crimped about the mid-portion of said rod ball end and slidably secured in said rotor for limited movement therein.

2. A pump as defined in claim 1 including bearing means in said housing mounting said rotor so that the radial forces to which the rotor is subjected are transferred to the housing, and means mounting said cam plate in the housing so that forces normal to the cam are transferred to the housing.

3. A pump having a housing, a drive shaft, a rotor mounted on said drive shaft and driven thereby, a cam plate about said drive shaft and spaced from and parallel to said rotor, a rotatable cylinder block driven by said drive shaft and inclined relative to said rotor and said cam plate, a plurality of cylinders in said cylinder block having inlet and outlet means, a plurality of pumping pistons reciprocally mounted at one end in said cylinder in said block, each piston having a rod with the rod end secured to said rotor for actuation by said cam plate so that rotation of said cylinder block causes reciprocation of said pistons in said cylinders, and force dividing means comprising means in said rotor for subjecting said rotor only to forces radial thereto and means on said cam plate for subjecting said cam plate only to forces normal thereto, said means for subjecting said cam plate to forces normal thereto comprising a slipper slidably mounted on said cam plate and in mating facial juxtaposition with said rod end and wherein said means for subjecting said rotor to forces radial thereto comprises a collar separate from said slipper circumferentially crimped about the mid-portion of said rod end and slidably secured in said rotor.

4. A pump as defined in claim 3 including bearing means in said housing mounting said rotor so that the radial forces to which the rotor is subjected are transferred to the housing, and means mounting said cam plate in the housing so that forces normal to the cam are transferred to the housing.

5. In a rotating cylinder block pump wherein pumping action is accomplished by the reciprocation of pistons in cylinders in said block, each having a rod with the end thereof operably associated with a rotating rotor and a non-rotating thrust plate, and wherein said reciprocation is caused by the inclination of said rotating cylinder block relative to said rotating rotor and said thrust plate, the improvement which comprises means for dividing forces received by said rotor and thrust plate from said piston rod end including means in said rotor for subjecting said rotor to forces only radial thereto and means in said thrust plate for subjecting said thrust plate to forces only normal thereto, said means for subjecting said thrust plate to forces normal thereto including a slipper slidably mounted on said thrust plate and in mating facial juxtaposition with said rod end and wherein said means for subjecting said rotor to forces radial thereto comprises a collar separate from said slipper circumferentially crimped about the mid-portion of said rod end and slidably secured in said rotor.

6. In a stationary cylinder block pump having a rotating cam and a reaction plate wherein pumping action is achieved by the rotation of an inclined cam reciprocating a plurality of pistons movably mounted in a plurality of stationary cylinders in a cylinder block, the improvement comprising means for dividing angular forces received by said rotating cam and reaction plate from said pistons into the normal and parallel components thereof, said means for dividing angular forces received from said pistons into the normal and parallel components thereof including means for subjecting said reaction plate only to forces radial thereto and means for subjecting said cam only to forces normal thereto, said means for subjecting said reaction plate to forces radial thereto comprising a collar secured to the piston rod end and slidably secured in said reaction plate for limited movement generally parallel to the axis of said reaction plate, and said means for subjecting said cam to forces normal thereto comprising a slipper separate from said collar slidably mounted on said cam and in mating facial juxtaposition with the piston rod end for limited movement radially of said cam.

7. In a pump having a housing, a drive shaft rotatably mounted through said housing, a cam and reaction plate assembly secured to and rotatable with said drive shaft, a stationary cylinder block in said housing and opposite said cam and reaction plate assembly, a plurality of cylinders in said block each having a piston with a rod extending outwardly therefrom wherein said rod is secured at its opposite end to said cam and reaction plate assembly, the improvement which comprises means for dividing angular forces received by said cam and reaction plate assembly from said piston rods into the normal and parallel components thereof, said means for dividing angular forces received from said piston rods into the normal and parallel components thereof including means for subjecting said reaction plate to forces radial thereto and means for subjecting said cam to forces normal thereto, said means for subjecting said reaction plate to forces radial thereto comprising a collar secured to the piston rod end and slidably secured in said reaction plate for limited movement generally parallel to the axis of said drive shaft, and said means for subjecting said cam to forces normal thereto comprising a slipper separate from said collar slidably mounted on said cam and in mating facial juxtaposition with the piston rod end for limited movement radially of said drive shaft.

8. In a hydraulic fluid translating device, a cylinder block having an annular series of axial cylinders with pistons reciprocable therein each having an articulated piston rod with a bearing assembly at the free end thereof, a thrust plate having a thrust surface inclined from a plane normal to the axis of the cylinder block, a reaction plate parallel to the thrust surface adjacent thereto and fixed against rotation relative to the cylinder block, an annular bearing fixed with the thrust plate on an axis normal to said thrust surface for taking radial thrust of said reaction plate, mounting means enabling relative rotation between the thrust plate and annular bearing on the one hand and the cylinder block, reaction plate, pistons, rods and bearing assemblies on the other hand, and said bearing assemblies each including an articulated bearing shoe on the rod slidable on the thrust surface for transmitting axial thrust between the piston rod and thrust plate and an articulated bearing collar on the rod slidable in the reaction plate for transmitting radial thrust between the rod and the annular bearing.

9. In a hydraulic fluid translating device, a rotatable cylinder block having an annular series of axial cylinders with pistons reciprocable therein each having an articulated piston rod, a fixed thrust plate having a thrust surface inclined from a plane normal to the axis of the cylinder block, articulated bearing shoes on the ends of the rods slidable on the thrust surface for transmitting axial thrust between the rods and the thrust plate, a reaction plate parallel to the thrust surface adjacent thereto and rotatable with the cylinder block, a fixed annular bearing for taking the radial thrust of the reaction plate, and articulated collars on the rod ends separate from the slippers slidable in the bearing plate for transmitting radial thrust between the rods and the reaction plate.

10. In a hydraulic fluid translating device, a fixed cylinder block having an annular series of axial cylinders with pistons reciprocable therein each having an articulated piston rod, a rotatable thrust plate having a thrust surface inclined from a plane normal to the axis of the cylinder block, articulated bearing shoes on the rod ends slidable on the thrust surface for transmitting axial thrust between the rods and the thrust plate, a bearing plate parallel to the thrust surface adjacent thereto and held against rotation relative to the cylinder block, an annular bearing rotatable with the thrust plate for taking radial thrust of the bearing plate, and articulated collars on the rod ends separate from the bearing shoes slidable in the bearing plate for transmitting radial thrust between the rods and the bearing plate.

References Cited by the Examiner

UNITED STATES PATENTS

| | | | |
|---|---|---|---|
| 1,817,063 | 8/31 | Carrie et al. | 103—162 |
| 2,241,701 | 5/41 | Doe | 103—162 |
| 2,918,012 | 12/59 | Lucien | 103—173 X |
| 2,968,961 | 1/61 | McGregor | 103—173 X |
| 3,073,254 | 1/63 | Hoover | 103—162 |

FOREIGN PATENTS 1,175,467  11/58  France.

LAURENCE V. EFNER, *Primary Examiner.*